Patented Oct. 20, 1936

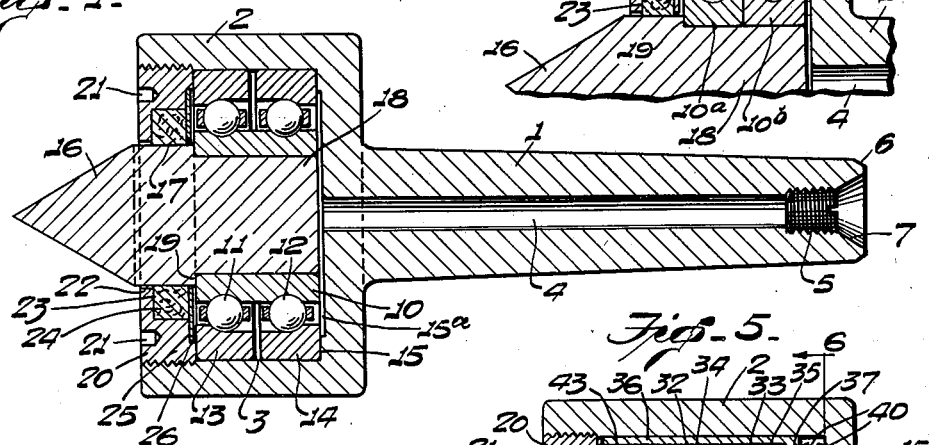

2,058,322

UNITED STATES PATENT OFFICE 2,058,322

COMBINATION LATHE CENTER

Joseph E. Kline, Alpena, Mich.

Application January 13, 1936, Serial No. 58,937

10 Claims. (Cl. 82—33)

The present invention relates to improvements in centers for lathes and other machine tools, and it relates more especially to centers of the class in which the center point is mounted by an anti-friction bearing or bearings in a shank adapted to fit into the tail-stock of a lathe or similar machine so that the center point revolves with the work engaged and centered by it.

One of the primary objects of the invention is to provide a novel and improved center of this class which is compact and durable and the center point and other running parts of which are maintained accurately on a fixed axis of rotation by an anti-friction bearing which is adjustable, and which provides for efficient lubrication of the bearing.

Another object is to provide an improved center of this class which embodies a novel construction and arrangement of packing means which will effectively prevent seepage or escape of the lubricant from the bearing or the entrance of grit or other injurious matter to the bearing.

A further object of the invention is to provide a combination lathe center which is adapted to interchangeably receive different center points, as for example machine tool and wood lathe center points, and which enables a center point to be removed without dis-assembling or otherwise disturbing the bearing and without injury to the packing means or other parts of the assembly.

To these and other ends, the invention consists in certain improvements and combinations and arrangements of parts all as will be hereinafter more fully described, the features of novelty being pointed out particularly in the claims at the end of this specification.

In the accompanying drawing:

Figure 1 is a longitudinal section taken axially through a lathe center constructed in accordance with the present invention;

Figure 2 is an end view of the center as viewed from the left in Fig. 1;

Figure 3 is a fragmentary detail sectional view taken on the line 3—3 in Fig. 2;

Figures 4 and 5 are fragmentary sectional views of modifications;

Figure 6 is a section on the line 6—6 in Fig. 5;

Figure 7 is a side elevation, partly in section, of a wood lathe center point which may be used interchangeably with a machine tool or other center point; and Figure 8 is an end view of the center point shown in Fig. 7 as viewed from the left in that figure.

Similar parts are designated by the same reference characters in the different figures.

Lathe centers embodying the present invention may be used advantageously for centering work in lathes, milling machines and other machine tools for centering and supporting the work while being turned, and the present invention provides a center which is adapted to receive interchangeably center points for metal turning or wood turning lathes. It is to be understood however that the invention is not restricted to the precise construction shown since equivalent constructions are contemplated and such will be included within the scope of the claims.

The center as shown in the present instance comprises a shank 1, which is preferably of a standard size and taper to fit into the tapered socket in the usual tail-stock of a lathe or similar machine tool, this shank being composed of suitable metal and having a bearing housing 2 of enlarged diameter formed preferably integrally on its larger end, the bearing housing being coaxial with the shank. The bearing housing is hollow and formed with a cylindrical interior wall 3 to receive the anti-friction bearing or bearings which support the center point, and the shank is provided with a bore 4 which extends axially therein throughout its length and communicates with the interior of the bearing housing. This bore, near the smaller end of the shank, is threaded to receive a removable threaded plug 5 for closing it, this plug being offset inwardly from the smaller end of the shank and the smaller end of the shank being chamfered at its outer edge 6 and at its inner circumference 7 leading to the bore, so that peening or other distortion of the smaller end of the shank, due to the action of the usual tail-stock screw in removing the shank from the tail-stock socket, will not distort the threads into which the plug 5 is fitted.

The bearing housing contains a bearing or bearings for rotatably supporting the center point. As shown in the present instance a single double row ball bearing is shown which comprises an inner race 10 which may be in one piece and provided with a pair of annular surrounding grooves to receive the annular rows of balls 11 and 12, and an outer race comprising in the present instance a pair of outer race members 13 and 14 with which the rows of balls 11 and 12 of the bearing cooperate respectively. The outer race member 14 is preferably provided with a tight or press fit in the bearing housing so that it will be fixed non-rotatably therein and this bearing member abuts at its inner end against an annular shoulder 15 which is formed on the inner end wall of the bearing housing, this end wall of the bearing housing being counter-bored at 15ª, leaving the shoulder 15 at its surrounding margin. The outer race member 13 is also non-rotatably fitted into the bearing housing but is capable of movement axially toward the race member 14 in order to adjust the bearing so that no looseness will be present therein and the inner race member 10 will be firmly supported for rotation accurately on a fixed axis.

The center point 16, which as shown in Fig. 1 is of a form suitable for use in a metal turning lathe, has an outer cylindrical portion 17 of a diameter greater than the internal diameter of the inner bearing race 10, and the center point has a portion 18 which is cylindrical in form and of a diameter to fit non-rotatably into the inner bearing race, as with a press fit although permitting removal of the center point from the inner bearing race by tapping against the center point with a hammer or other suitable tool. The relatively larger portion of the center point forms an annular shoulder 19 between it and the portion 18, this shoulder preferably lying in a plane perpendicular to the axis of the center point, and this shoulder abuts directly against the outer side of the inner bearing race 10 and thereby transmits the axial thrust imposed upon the center point to the bearing. The counter-bore 15ª formed in the inner end wall of the housing provides a running clearance between it and the inner side of the rotatable bearing race 10 and the inner end of the center point, and this counter bore also provides a passageway through which a suitable lubricant introduced through the bore 4 may effectively reach all parts of the bearing.

The outer end of the bearing housing, which is open, is threaded to receive a bearing retainer 20, the bearing retainer having a relatively tight fit with the threads in the bearing housing so that it may be rotated in the bearing housing but will remain in the different positions into which it is rotated. The outer face of the bearing retainer is provided with a pair of diametrically spaced notches or bores 21 in which the lugs on an ordinary spanner wrench of suitable size may be engaged to rotate it. The bearing retainer is formed with a central circular opening 22 of a diameter slightly larger than that of the relatively larger portion 17 of the center point so that the center point extending through the bearing retainer may rotate freely therein without friction against the bearing retainer, and the bearing retainer is formed with an annular recess 23 in its inner side and inner circumference, and a belt or other suitable packing ring 24 is fitted into this recess, the packing ring surrounding and bearing against the relatively enlarged portion 17 of the center point to form a fluid tight fit therewith which will seal the housing at this point and prevent the escape of lubricant therefrom or the entrance of grit or injurious foreign matter thereto which would damage the bearing. The inner face of the bearing retainer is formed with an annular counter-bore 25 which is of greater diameter than that of the annular groove 23, so that this counter-bore extends outwardly beyond said recess, and a packing ring retainer 26, composed preferably of an annular ring of flat metal, is fitted tightly into the counter-bore, it preferably having a press fit therein. This packing ring retainer engages the inner side of the packing ring 24 and thereby retains it non-rotatably in its recess, and the central opening in the packing ring retainer is slightly larger than the diameter of the relatively large portion 17 of the center point so that the center point may rotate freely without frictional engagement with the packing ring retainer. The packing ring retainer 26 is of a thickness less than the depth of the counter-bore 25, as shown clearly in Fig. 4, so that the inner face of the packing ring retainer will be offset outwardly from the shoulder 19 on the center point and from the outer side of the rotatable inner bearing race 10, the clearance thus provided between the packing ring retainer and the inner bearing race avoiding any friction or interference between the packing ring retainer and the inner bearing race. The inner face of the bearing retainer 20 beyond the periphery of the counter-bore 25 abuts directly against the outer race member 13, so that adjustment of the bearing retainer axially in the bearing housing, by rotation of the bearing retainer will adjust the outer race member 13 with respect to the outer race member 14, thereby enabling the bearing to be adjusted so that the inner race and center point will rotate accurately on a fixed axis, and the bearing retainer will firmly support the bearing in its adjusted condition and sustain any axial thrust exerted on the bearing in a direction toward the bearing retainer. The outer race members have ball races at their adjacent sides, and since these race members are supported firmly by the shoulder 15 and bearing retainer 20 against which they abut, the bearing will effectively sustain axial thrust in either direction. Since the bearing retainer 20 is non-rotatable and the packing ring retainer 26 fixed therein is also non-rotatable, the only friction that will occur on the packing ring 24 will be that produced between it and the rotating center point so that wear of the packing ring is minimized, and the packing ring retainer will prevent any felt or other material composing the packing ring from entering the bearing, this being particularly advantageous when the center point is revolved at high speed as in wood turning.

The center according to the present invention enables different center points to be used interchangeably therein. For example in Fig. 1 the center point is of a form suitable for use in a metal turning lathe and Figs. 7 and 8 disclose a center point 16ª which is suitable for use in a wood turning lathe, it having a relatively enlarged diameter 17ª, a relatively reduced diameter 18ª and a shoulder 19ª therebetween corresponding to the portions 17, 18 and 19 respectively of the center point shown in Fig. 1. In order to remove a center point and to substitute another, it is only necessary to remove the screw plug 5 from the shank, insert a punch or other tool into the axial bore 4 and against the inner end of the center point, and to tap against the punch or tool and thereby drive the center point from the inner bearing race 10, and after a center point has been thus removed, another center point may be inserted through the bearing retainer and packing ring until the shoulder 19 or 19ª thereon abuts against the inner bearing race 10. Since the bearing retainer 20 abuts directly against the outer race member 13 and the balls in the bearing prevent movement of the inner race 10 axially toward the bearing retainer, such force as may be applied to the center point in removing it from the inner bearing race will be effectively sustained by the bearing retainer 20 without forcing of the inner race 10 against the packing ring retainer 26, so that injury to the packing ring retainer is thereby precluded, and of course the center point is removed without requiring dis-assembly of the bearing and without disturbing the adjustment thereof. When another center point is forced into the bearing, the axial thrust incident thereto and exerted on the inner bearing race 10 is sustained firmly by the outer race member 14 which abuts against the shoulder 15 on the inner end wall of the housing. By forming the relatively large portion 17 or 17a on the center point of cylindrical shape, disturbing of the fluid-tight fit of the packing ring on this portion of the center point is minimized or avoided. Lubrication of the bearing is accomplished with facility by removing the screw plug 5, injecting the lubricant through the bore 4 into the bearing housing as by a grease gun, and then replacing the screw plug.

The preferred embodiments of the invention are shown in the present instance but obviously modifications may be made and yet accomplish the objects of the invention. For example, instead of employing a single double row annular ball bearing, as shown in the present instance, other standard forms of bearings may be used which are capable of sustaining axial thrust in both directions and provide for the adjustment hereinbefore described, as for example a pair of annular ball bearings of suitable or well-known form may be used.

Figure 4 shows a pair of annular ball bearings for supporting the center point 16 in the housing 2, these bearings comprising inner races 10a and 10b in which the reduced portion 18 of the center point is fitted removably, and outer races 13a and 14a fitted non-rotatably in the cylindrical interior of the housing 2. The shoulder 19 on the center point abuts directly against the inner race 10a of the outer bearing, and the inner side of the outer race 14a abuts directly against the shoulder 15 on the inner end wall of the housing. The bearing retainer 20 abuts against the outer side of the outer race 13a of the outer bearing, and adjustment of the threaded bearing retainer by rotation thereof will adjust the bearings to take up any looseness therein, thus maintaining the center point accurately on a fixed axis of rotation, and the axial thrust applied by the work to the center point will be transmitted from the shoulder 19 thereon to the inner bearing race 10a thence to the inner bearing race 10b and, through the balls of this bearing, to the outer bearing race 14a, and the thrust from the latter will be sustained directly by the shoulder 15 on the inner end wall of the bearing housing.

Figure 5 shows another embodiment of the invention wherein the bearings are mounted in a bearing adapter and means is provided for adjusting the bearings automatically. In this embodiment of the invention, a duplex annular ball bearing comprising inner races 30 and 31 are fitted removably on the reduced portion 18 of the center point, annular rows of ball bearings 32 and 33 and outer races 34 and 35, the latter being adapted to sustain the axial thrust on the center point toward the inner end of the housing 2, and the outer races 34 and 35 are fitted with a hard push fit into the cylindrical portion of a bearing adapter 36 so that they will be non-rotatable therein, and the adapter is fitted slidably with a push fit into the cylindrical interior of the housing 2 so that the adapter will be non-rotatable therein. The inner end of the adapter is formed with an inturned flange 37 against which the inner side of the outer bearing race 35 abuts, and resilient adjusting means is interposed between the adapter and the inner end wall of the housing. Such resilient adjusting means, as shown, comprises a disk 38 of spring steel or other suitable resilient material having a central aperture 39 in alinement with the axial bore 4 of the shank to admit insertion of the punch or other tool for removal of the center point, the peripheral portion of the disk being split radially at intervals in its circumference to form a series of tongues 40, and these tongues being bent alternately in opposite directions from the plane of the disk so that some of these tongues will bear against the inner side of the flange 37 of the adapter and the rest of these tongues will bear against the shoulder 15 on the inner end wall of the housing. The resilient disk thus provided not only compensates for the expansion of the piece of work or material held between the machine tool centers while being machined, but the tension of the spring tongues acting against the bearing adapter also retains the bearing adapter against turning so that an excessively tight fit between the bearing adapter and the housing to prevent the adapter from rotating therein is rendered unnecessary. A clearance is provided between the outer end of the adapter and the bearing retainer 20, the internal depth of the retainer being less than the total width of the bearings, thus allowing the spring tongues of the disk to adjust the outer bearing races 34 and 35 automatically in relation to the inner bearing races while the center point is not engaged with the piece of work, the fit of the outer bearing races in the adapter being such as to retain the bearings in adjustment and yet prevent rotation of the outer bearing races in the adapter. A single row annular ball bearing is preferably mounted adjacent to the outer end of the center point, such bearing, as shown, comprising an inner race 41 in which the reduced portion 18 of the center point is fitted removably and against which the shoulder 19 abuts, an annular row of ball bearings 42 and an outer race 43 fitted adjustably but non-rotatably in the bearing adapter, this bearing being especially adapted to sustain the radial load on the center point. In this form of bearing mounting, the inner bearing races 30, 31 and 41 abut directly against one another and the inner race 41 abuts against the shoulder 19 on the center point, receiving the axial thrust therefrom, and since the outer races 34 and 35 receive the axial thrust from the inner races 30 and 31 and the outer race 35 abuts against the inturned flange 37 of the bearing adapter, the axial thrust is thus transmitted to the adapter, and the axial thrust from the adapter is transmitted through the spring tongues 40 to the thrust shoulder 15 at the inner end wall of the housing. Since the bearing retainer bears against the outer side of the bearing race 43, adjustment of the bearing retainer will adjust said outer race to take up any axial clearance or end play in the bearings.

I claim as my invention:—

1. A lathe center comprising a shank having a bearing housing thereon, a center point having an annular enlarged portion thereon and a cylindrical portion of reduced diameter adjacent thereto, said enlarged and reduced portions of the center point forming a shoulder at their junction, an anti-friction bearing contained in said housing and having the cylindrical portion of the center point of reduced diameter fitted therein and the shoulder of the center abutting directly against it, a bearing retainer fixed to and closing said housing and through which the enlarged portion of the center point extends, a packing element recessed in the bearing retainer and surrounding and engaging the enlarged portion of the center point, and a packing retainer fixed in the bearing retainer in axially spaced relation to the bearing and in which the enlarged portion of the center point is rotatable.

2. A lathe center comprising a shank having a bearing housing thereon, a center point having an annular enlargement thereon forming a shoulder between its ends, an anti-friction bearing supporting the center point in the housing, said bearing having a plurality of outer races relatively adjustable axially of the housing and an inner race against which said shoulder on the center point abuts, a bearing retainer adjustable axially of and closing an end of the housing and cooperative with one of said outer bearing races to adjust it relatively to another of said races and through which the enlargement on the center point extends, a packing recessed in the bearing retainer and engaging the enlargement on the center point, and a packing retainer countersunk into the inner side of the bearing retainer and fixed therein, said packing retainer having clearance spaces between it and the inner bearing race and the enlargement on the center point.

3. A lathe center comprising a shank having a bore extending axially therethrough and a bearing housing at an end coaxial with the shank, an anti-friction bearing comprising inner and outer races mounted in the housing, a bearing retainer adjustable axially in and closing the housing and cooperating with the outer bearing race for adjusting it, said retainer having a central bore therein and an annular recess extending from the inner side of said retainer and having an annular counter-bore in its inner side of greater diameter than said recess, a packing ring in said recess, a packing retainer fixed in the counter-bore in the bearing retainer and cooperative with the packing ring, said packing retainer being opposite to but spaced axially from the inner bearing race, and an interchangeable center point extending through the bearing retainer, packing ring and packing retainer and into the bearing and removable therefrom by a tool inserted in the axial bore in the shank.

4. A lathe center comprising a shank having a bore extending axially therethrough and a bearing housing at one end of the shank coaxial therewith, a thrust-sustaining anti-friction bearing embodying a rotatable inner race and an outer race fixed in said housing, the outer race abutting against the inner end wall of the housing, a center point having an enlarged portion forming a shoulder which abuts directly against the outer side of the inner race of the bearing, an annular bearing retainer fixed in and closing the outer end of the housing, said retainer abutting rigidly against the outer side of the outer race of the bearing, said retainer having an annular recess in its inner face and inner circumference and having a counterbore in its inner face of greater diameter than said recess, a packing ring contained in said recess and surrounding and cooperating with the enlarged portion of the center point, and an annular packing ring retainer of less thickness than the depth of the counterbore and fixed in the counterbore in retaining relation with the packing ring, the packing ring retainer having a clearance space between it and the adjacent outer face of the rotatable inner race of the bearing.

5. A lathe center comprising a shank having a bearing housing thereon open at one end, an anti-friction bearing having inner and outer races, the outer race embodying race members which are non-rotatably fitted into the housing, one of the outer race members abutting against the inner end wall of the housing and the other outer race member being relatively adjustable axially with respect to the other outer race member, said bearing being capable of sustaining axial thrust in either direction, a center point removably fitted in the inner bearing race member and having a shoulder thereon abutting directly against said inner race member, a bearing retainer threaded in the outer open end of the bearing housing and abutting against the adjacent outer bearing race member for adjusting it axially relatively to the other outer race member and for sustaining axial thrust thereon, said bearing retainer having a central opening and an annular groove therein to surround the center point and having a counterbore in its inner side surrounding said recess, a packing ring in said groove and surrounding and cooperative with the center point, and a packing ring retainer of less thickness than the depth of the counterbore and fixed therein, said packing ring retainer being spaced axially from the inner race member engaged by the shoulder on the center point.

6. A lathe center comprising a shank having a bearing housing thereon, a center point having an annular enlarged portion thereon and a portion of reduced diameter forming a shoulder at their junction, a ball bearing comprising an inner race into which the reduced portion of the center point fits removably and against which the shoulder on the center point abuts, said inner race having a pair of annular grooves, rows of balls in said grooves, and a pair of outer races cooperative with the respective rows of balls, said outer races being fitted in the housing and relatively movable axially, one of the outer races abutting at its inner side against the inner end wall of the housing, and a bearing retainer adjustable axially in the other end of the housing and cooperative with the outer side of the other outer race to sustain axial thrust thereon and to adjust such outer race relatively to the other outer race.

7. A lathe center comprising a shank having a bearing housing thereon, a center point having an annular enlarged portion thereon and a portion of reduced diameter forming a shoulder at their junction, a pair of ball bearings comprising outer races fitted into said housing and inner races into which the reduced portion of the center point fits removably, the shoulder on the center point abutting directly against the outer side of the inner race of the outer bearing and the outer race of the inner bearing abutting against the inner end wall of the housing, a bearing retainer fixed to and closing the housing, a packing member recessed in the bearing retainer and engaging the enlarged portion on the center point, and a packing retainer fixed in the bearing retainer in axially spaced relation to the races of the adjacent outer bearing.

8. A lathe center comprising a shank having a bearing housing thereon, a center point having an enlarged outer portion forming a shoulder thereon, a bearing adapter fitted non-rotatably but movable axially in said housing, axial thrust sustaining bearings fitted non-rotatably in said adapter and having the center point mounted therein to transmit axial thrust thereto, and resilient means interposed between the adapter and the housing and operative to adjust said bearings axially.

9. A lathe center comprising a shank having a bearing housing thereon, a center point having an enlarged outer portion forming a shoulder thereon, a bearing adapter fitted non-rotatably but movable axially in said housing, axial thrust sustaining bearings fitted non-rotatably in said adapter and having the center point mounted therein to transmit axial thrust thereto, and a disk in said housing having its periphery split radially to form tongues bent in opposite directions with respect to the plane of the disk and bearing respectively against the adapter and the inner end of the housing.

10. A lathe center comprising a shank having a bearing housing thereon, a center point having an enlarged outer portion forming a shoulder thereon, a bearing adapter fitted non-rotatably but movable axially in said housing, axial thrust sustaining bearings fitted non-rotatably in said adapter and having the center point mounted therein to transmit axial thrust thereto, said bearings having outer races fitted non-rotatably in the adapter and having inner races into which the center point is fitted removably, the shoulder on the center point abutting against the inner race of one of the bearings, the adapter having a thrust-sustaining flange engaged by the outer race of another of said bearings, and automatic bearing adjusting means interposed between the adapter and the inner end wall of the housing.

JOSEPH E. KLINE.